May 17, 1927.

G. C. GOODE 1,628,967

BRAKE ACTUATING DEVICE

Filed Nov. 25, 1922   2 Sheets-Sheet 2

Patented May 17, 1927.

1,628,967

UNITED STATES PATENT OFFICE.

GILBERT C. GOODE, OF EAST CLEVELAND, OHIO, ASSIGNOR TO THE WHITE MOTOR COMPANY, OF CLEVELAND, OHIO, A CORPORATION OF OHIO.

BRAKE-ACTUATING DEVICE.

Application filed November 25, 1922. Serial No. 603,245.

The present invention relates to a device for actuating a brake mounted upon the front wheel of a motor vehicle and has for its object to provide an efficient brake operating connection between the brake band shifter carried by the wheel spindle and operating members on the vehicle frame by means of which the brake is operable regardless of the positions of the wheel and in which the operation of the brake is not affected by pivotal movement of the wheel spindle or relative vertical movements between the wheel spindle and vehicle frame.

Other objects will be apparent from the following description and the accompanying drawings.

Figure 1:
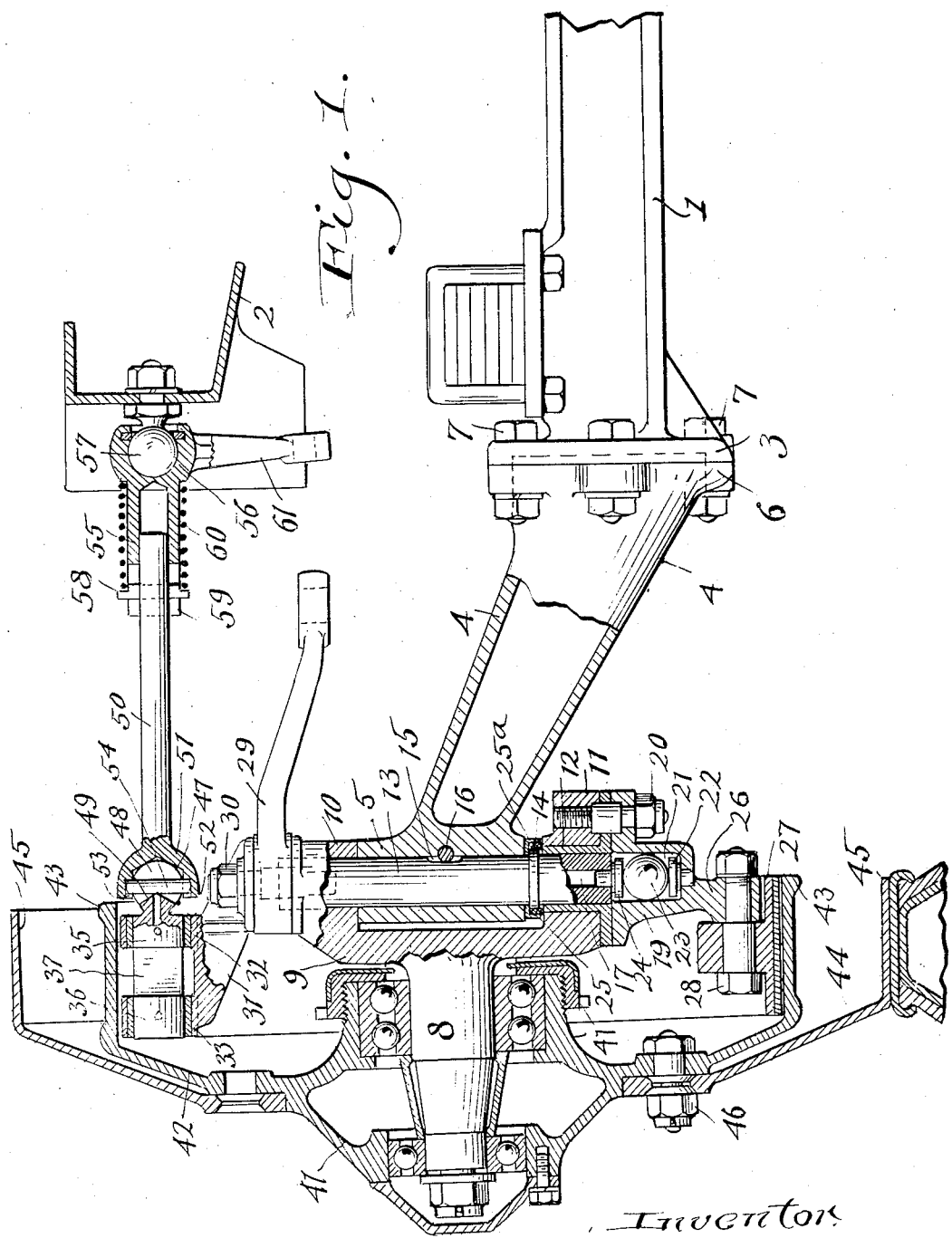
Figure 2:
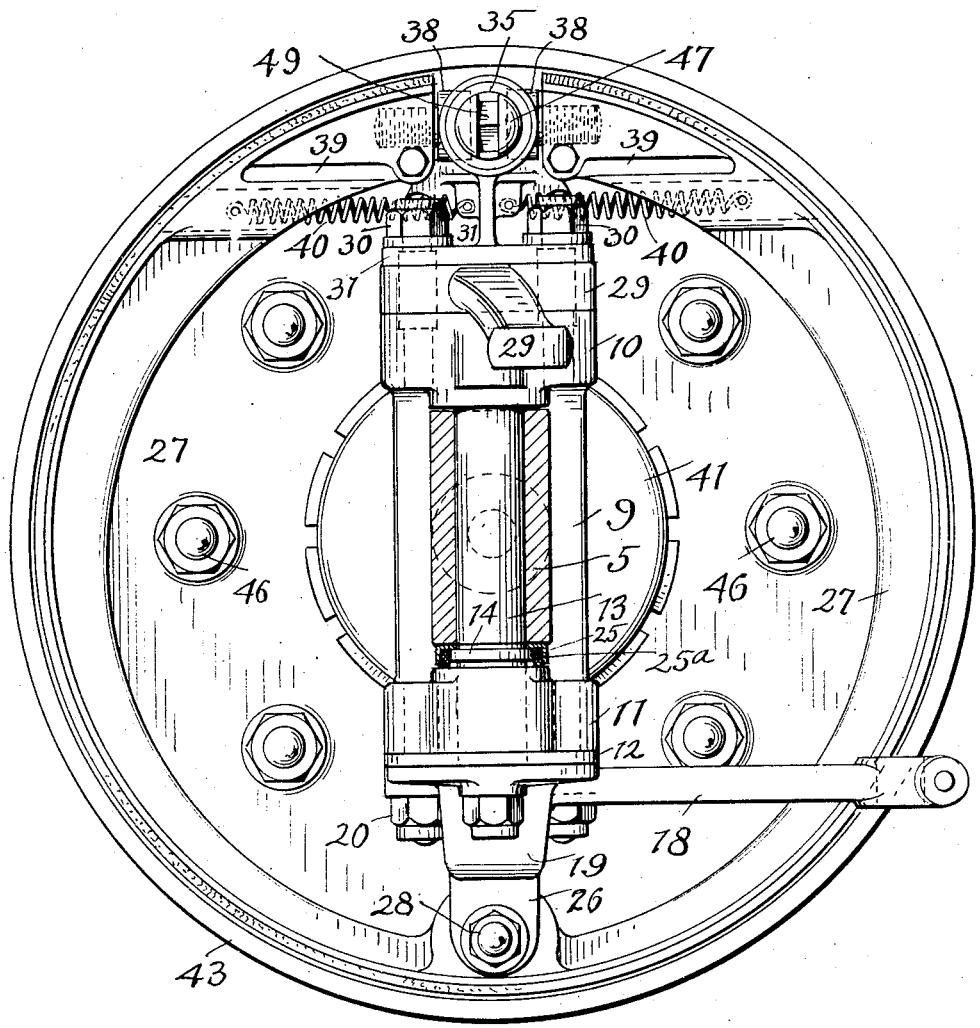
Figure 4:
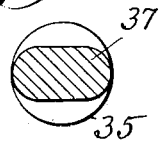
Figure 3:
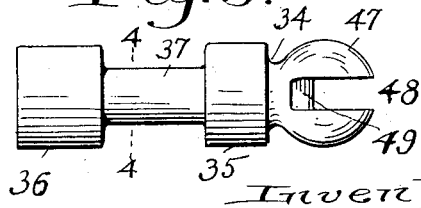

Reference should be had to the accompanying drawings in which Fig. 1 is a fragmentary view partially in vertical transverse section showing the steering wheel, steering knuckle and brake mechanism and the connections between the steering wheel parts and vehicle frame; Fig. 2 is a side elevation of the steering knuckle and wheel hub looking from the inner side thereof; Fig. 3 is a plan view of the expanding cam for the brake band; Fig. 4 is a section on line 4—4 of Fig. 3.

In the accompanying drawings a fragmentary portion only of the vehicle is shown, the front axle being designated by the reference numeral 1 and the vehicle frame being designated by the reference numeral 2, the frame 2 being yieldably supported in the usual manner by means of springs from the axle. The axle 1 has a flange 3 at its end and an upwardly inclined extension 4 having a vertically disposed pivot pin receiving sleeve 5 at its outer end, and has a flange 6 at its inner end which is rigidly secured to the axle 1 by means of bolts 7 which pass through the flanges 3 and 6 of the axle and axle extension. When the brakes are carried by the front wheels on the spindles pivoted to the ends of upwardly inclined axle ends the axles are subjected to severe torque which tends to twist the axle at the bend between the straight central portion and the inclined ends. When the axle is integral from end to end it is necessary to make the axle very heavy to resist the twisting stresses. In the present invention, however, this difficulty is avoided by making the body of the axle and the inclined ends of separate pieces 1 and 4 and connecting them by bolting through the relatively wide flanges 3 and 6. By employing this construction the axle can be made of sufficient strength at the bend to resist the torsional stresses without making the axle unduly heavy. The spindle 8 has a vertically disposed integral knuckle portion at its inner end from which extend upper and lower flanges 10 and 11 which fit over the upper and lower ends respectively of the pivot sleeve 5 and which have pin receiving apertures adapted to be aligned with the aperture in the sleeve 5. The aperture in the lower flange 11 is of slightly greater diameter than the aperture in the sleeve 5 and is adapted to receive a bushing 12, the internal diameter of which is the same as the internal diameter of the sleeve 5. A pivot pin 13 which has a shoulder portion 14 of enlarged diameter toward its lower end is adapted to be inserted through the apertures in the flange 11, sleeve 5 and flange 10, the shoulder portion 14 passing through the enlarged aperture in the flange 11 and engaging the lower end of the sleeve 5. The pivot pin 13 has a notch 15 in the side thereof adjacent its center which is engaged by a taper pin 16 which is inserted through a transverse aperture in the sleeve 5. The pivot pin 13 is preferably provided with an axial lubricant passage 17 therethrough through which lubricant may be supplied to the pin supporting bearings. After the pin 13 has been inserted the bushing 12 which has a flange overlying the underface of the flange 11 is slipped over the lower end of the pin 13. A lower steering arm 18, to the outer end of which the connecting member between the two front wheels of the vehicle is adapted to be attached, has an enlarged inner end 19 adapted to be secured to the underside of the flange 11 by means of bolts 20. The enlarged end 19 of the steering arm forms a supporting member for the pivot pin and has formed therein directly beneath the pivot pin a ball pocket 21. In the bottom of the pocket 21 is secured a hardened steel plug 22. A second hardened steel plug 24 has its stem fitting in the lower end of the axial passage 17 of the pivot pin and a head portion which rests upon a supporting ball 23 which in turn rests upon the plug 22 in the bottom of the ball pocket 21.

The weight of the vehicle is transmitted through the sleeve 5 to the shoulder 14 of the pivot pin and from the pivot pin to the supporting ball 23. The ball support for the pivot pin permits swinging movement of the wheel spindle with respect to the axle and offers a minimum of frictional resistance to such movement. A hardened steel cup 25 fits over the enlarged portion 14 of the pivot pin 13 and a ring of compressible material 25ᵃ surrounds the shoulder 14 within the depending flange of the cup 25. The ring 25ᵃ and cup 25 are of greater diameter than the aperture in the flange 11 and serve as a bearing between the sleeve 5 and flange 11. In assembling the cup 25 with the ring 25ᵃ therein is placed over the aperture in the flange 11 prior to the insertion of the pivot pin. An arm 26 extends downwardly from the enlarged portion 19 of the lower steering arm and is connected to the webs of pivoted expansible internal brake shoes 27 by means of a bolt 28 which also serves to pivotally connect the shoes 27. The upper steering arm 29 which is adapted to be suitably connected to the vehicle steering mechanism has its inner end rigidly secured upon the upper face of the knuckle flange 10 and is bored to receive the upper end of the pivot pin 13. The steering arm 29 is secured to the flange 10 by means of bolts 30 which pass through a bearing bracket 31 upon the upper face of the arm 29 and through the arm 29 into the knuckle flange 10. The bearing bracket 31 has a portion extending outwardly and upwardly from the base thereof and at its upper end has laterally spaced bearing portions 32 and 33 adapted to receive a rotatable brake operating member 34. The brake operating member 34 has inner and outer spaced cylindrical portions 35 and 36 which fit within the spaced bearing portions 32 and 33 of the bearing bracket and an intermediate cam 37 engageable with the ends of the brake shoes to expand them into engagement with the brake drum. The brake shoes 27 have bearing bolts 38 secured in the ends thereof and the heads of the bolts 38 extend between the spaced bearing members 32 and 33 and engage opposite faces of the operating cam 37. The brake shoes 27 are provided with slots 39 in the web thereof adjacent to the ends thereof to increase their flexibility and reduce the weight at the ends engaged by the cam and may be provided with coiled springs 40 connected to the opposed ends of the brake shoes and to the bearing bracket 21. The wheel hub 41 is removably secured upon the spindle 8, is provided with the usual ball bearings and has integral therewith an outwardly dished web 42 terminating in an inwardly extending cylindrical flange 43 which forms the brake drum closely overlying the expansible brake shoes 27. An outwardly dished disk wheel 44 having a rim portion 45 overlying the brake drum flange 43 is secured to the web 42 of the brake drum by means of bolts 46. The inner edges of the rim 45 of the wheel and of the brake drum flange 43 are in substantially the same vertical plane which is closely adjacent the pivotal axis of the steering spindle.

By reason of this construction the brake mechanism lies within the peripheral portions of the wheel so that it is less likely to be damaged by striking obstructions and whereby the braking effect on the wheel is very efficient.

It is important that the brake mechanism be provided with operating connections to a suitable operating device on the vehicle frame which is operable to apply the brake regardless of the position of the wheel with respect to the axle and which is not affected by vertical movements of the vehicle frame with respect to the wheel and axle. For operating the brake mechanism the operating member 34 has a ball head 47 at its inner end by means of which it is connected to an operating shaft. The ball head 47 is provided with a central transverse recess 48 extending from its outer end adapted to receive a driving pin, the bottom of the recess being formed to slope outwardly from a central point to form an angular central bearing point 49. An operating shaft 50 has an enlarged end 51 formed with a socket to receive the ball end 47 of the operating member 34 and the end 51 of the shaft 50 is provided with notches 52 and 53 extending inwardly from the end thereof at diametrically opposite points within the ball receiving socket. A pivot and driving pin 54 has its ends fitting within the notches 52 and 53 and lies within the transverse recess 48 of the ball extension 47 with ts outer edge against the angular bearing point 49. At its inner end the shaft 50 has a telescopic engagement with a tubular extension 55 which has an enlarged inner end 56 formed with a ball receiving socket adapted to receive a ball head 57 rigidly attached to the frame 2. Adjacent its inner end a transverse pin 58 extends through the shaft 50 and is received in a notch 59 in the end of the tubular extension 55. The end portions of the pin 58 on the inner sides thereof are notched to provide a flat bearing space and a compression coiled spring 60 surrounds the tubular extension 55 with its outer end in engagement with the flattened faces of the pin 58 and its inner end in engagement with the enlarged head 56 of the extension 55. An integral operating arm 61 extends from the enlarged head 56 of the shaft extension and is adapted to be connected to the brake lever on the vehicle frame. The compression spring 60 serves to hold the end sockets 51 and 56 in engagement with the ball heads 47 and 57, regardless of the position of the wheel with respect to the axle or the vertical position of the frame with respect to the wheel and axle.

The universal driving connection formed by the ball head 47, socket 51 and driving pin 54 is directly in line with the pivot pin 13 so that pivotal movement of the steering spindle does not materially affect the universal driving connection and so that the operating shaft 50 is required to have only sufficient movement with respect to the extension 55 to take care of the movements of the vehicle frame with respect to the axle and wheel.

Having described my invention, I claim—

1. The combination with a vehicle having a steering wheel mounted upon a spindle pivoted to swing about a vertical axis, of a brake drum carried by the wheel, a brake shoe and a brake shoe actuating member supported on said spindle, and means for actuating said brake shoe from the vehicle frame comprising an operating shaft comprising two telescopically connected sections, a compression spring interposed between said shaft sections, one of said shaft sections having a universal joint connection with said brake shoe actuating member and the other of said shaft sections having a universal joint connection with a part fixed to the vehicle frame, said spring acting to press said first mentioned shaft section toward said actuating member.

2. The combination with a vehicle having a wheel mounted upon a spindle pivoted to swing about a vertical axis, of a brake for said wheel, an actuating member for said brake rotatably mounted on said spindle, said actuating member having an axial extension, an actuating shaft having inner and outer telescopically connected sections, the outer of said sections having a universal driving connection with the extension of the actuating member, said outer shaft section being separable from the actuating member by endwise movement inwardly, the inner of the sections having a universal connection with the vehicle frame, and a spring interposed between the sections of the shaft and pressing outwardly upon the outer section to hold the same in engagement with the actuating member.

3. The combination with a vehicle having a wheel mounted upon a spindle pivoted to swing about a vertical axis, of a brake for said wheel, an actuating member for said brake rotatably mounted upon the spindle and having an axial extension, an actuating shaft having inner and outer telescopically connected sections, the outer section having a universal driving connection with the extension of the actuating member, a connecting member for the inner shaft section rigidly secured to the vehicle frame and projecting outwardly therefrom, said connecting member having an enlarged spherically shaped outer end, the inner shaft section having a socket at its inner end fitting on said spherical portion and a socket at its outer end in which the outer section of the shaft slidably fits, a compression spring interposed between the telescopically connected sections, means for preventing relative rotation between the shaft sections, and an actuating arm carried by the inner section of the shaft.

4. The combination with a vehicle having a wheel mounted upon a spindle pivoted to swing about a vertical axis, of a brake drum carried by the wheel, a brake shoe mounted on the spindle and cooperating with said drum, and means for actuating said shoe comprising an actuating member rotatably mounted upon the spindle and a shaft comprising two telescopically connected sections, the outer section of the shaft and the actuating member having interfitting end portions separable by a relative endwise movement and forming a universal driving connection, the inner section of the shaft being keyed to the outer section and having a universal connection with the frame, means for holding said outer section and actuating member in engagement comprising a compression spring exerting an outward pressure on the outer section, and means for turning said shaft.

In testimony whereof, I hereunto affix my signature.

GILBERT C. GOODE.